M. CUENDET.
VISE.
APPLICATION FILED MAR. 20, 1919.
1,345,665.
Patented July 6, 1920.
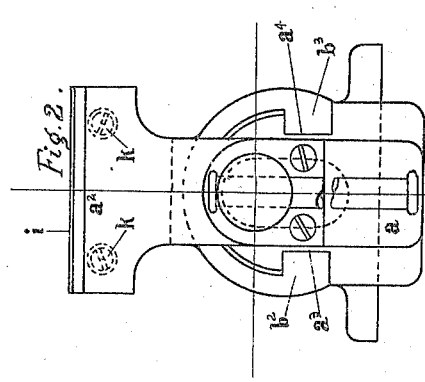
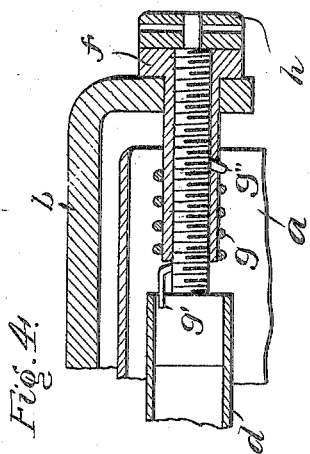
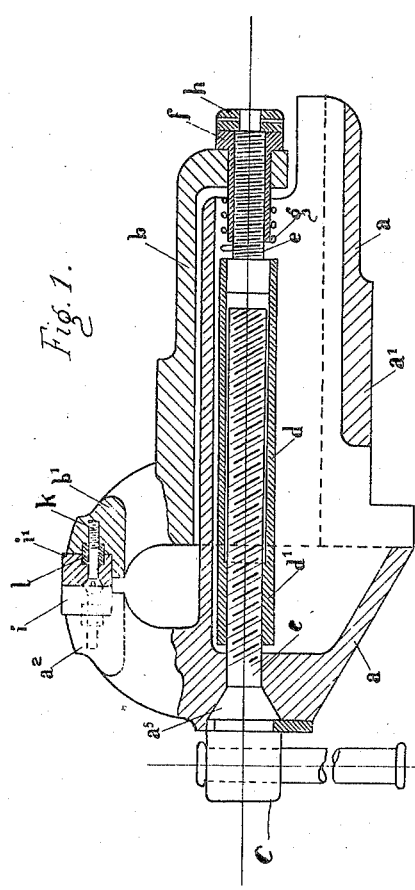
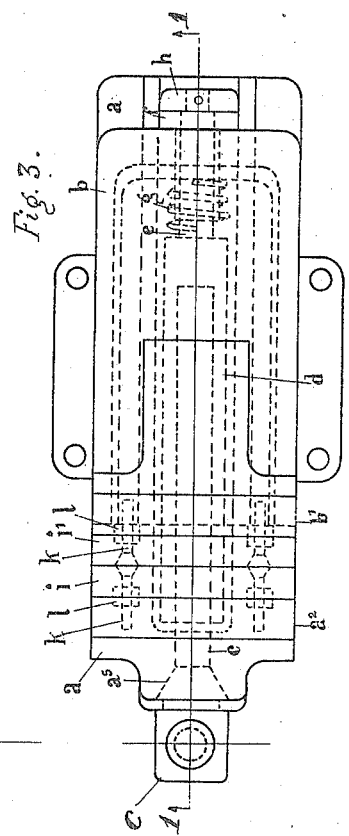
Inventor
Maurice Cuendet
by Roberts Roberts & Cushman
his Attorneys

UNITED STATES PATENT OFFICE.

MAURICE CUENDET, OF CORDEX PAR VICH, SWITZERLAND.

VISE.

1,345,665.  Specification of Letters Patent.  Patented July 6, 1920.

Application filed March 20, 1919. Serial No. 283,814.

*To all whom it may concern:*

Be it known that I, MAURICE CUENDET, a citizen of the Confederation of Switzerland, and resident of Cordex par Vich, Canton of Vaud, Switzerland, have invented new and useful Improvements in Vises, of which the following is a specification.

This invention relates to vises and more particularly to vises of the general class wherein provision is made for rapidly moving one or both jaws to and away from the work. The object of the invention is to provide a vise of this general class which is of simple and strong construction and in which effective provision for rapidly moving the jaws to and away from the work is combined with means for insuring the firm grip essential to the operation of said jaws when in working position.

Referring to the drawings which illustrate an embodiment of my invention,—

Figure 1 is a longitudinal section of the improved vise on the line 1—1 (Fig. 3);

Fig. 2 is a front view;

Fig. 3 is a plan view, and Fig. 4 is an enlarged detail view.

In said drawings $a$ is the frame of the vise provided on its under side with a holding plate $a^1$ for securing the device to a work table or other suitable support. The said frame is provided with an upwardly extending portion upon which is the fixed jaw $a^2$ of the vise. Slidably mounted on said frame is a movable member $b$, U-shaped as best shown in Fig. 2, and having guide flanges $b^2$ and $b^3$ fitting into guide channels $a^3$ and $a^4$ in the frame $a$. Said movable member $b$ is formed with an upwardly extending portion constituting a movable jaw $b^1$ adapted to coöperate with the fixed jaw $a^2$.

The working faces $i$ and $i^1$ are secured to their respective jaws $a^2$ and $b^1$ by screws $k$ passing through bushings $l$ seated in recesses formed in said working faces and jaws, thus effectively locking said working faces against movement when the jaws are firmly clamped upon the work.

Within said frame $a$ is a threaded stem or screw $c$ having a conical head $a^5$ fitting within a conical recess in the front of said casing $a$. Secured to said head is the usual handle C. Said stem or screw $c$ is threaded into an elongated tube or sleeve $d$ having a thread portion $d^1$. Co-axially with said stem $c$ and fast to said tube $d$ is a stem or screw $e$ threaded into a sleeve $f$ which passes through and is fast in a downwardly extending portion of the movable member $b$, said stem $e$ being provided with a head $h$ adapted to engage the face of the sleeve $f$. A torsional spring $g$ is disposed around the shank of the sleeve $f$ one end $g''$ of said spring being secured to said sleeve and the other end $g'$ to the stem or screw $e$ (Fig. 4).

The threads upon the stems or screws $c$ and $e$ and their respective sleeves $d$ and $f$ are cut at different angles or pitches so that upon rotation the stem $c$ is relatively quick acting while the stem $e$ is relatively slow.

The operation is as follows:—The jaws being open and the work positioned therebetween in the usual way, the handle C is rotated causing rotation of the screw $c$. The tube or sleeve $d$, in which the said screw $c$ is threaded, is held against rotation by the spring $g$ and is drawn rapidly along the screw $c$, this movement being communicated to the movable member $b$ by reason of its connection with said tube through the screw $e$ and sleeve $f$. The movable jaw $b^1$ carried by said movable member $b$ is thus quickly brought against the work.

As soon as the jaws close upon the work the pressure resulting from further or continued rotation of the screw $c$ overcomes the resistance of spring $g$ whereupon the screw $c$ with its tube $d$ rotate together causing rotation of the relatively slow moving and powerful screw $e$ forcing the movable jaw $b^1$ firmly against the work and clamping it in working position.

As shown in Fig. 1 the parts are in the position assumed just as the jaws close upon the work and before sufficient pressure has been applied to cause rotation of the screw $e$. It will be understood that upon rotation of said screw $e$, as above described, the screw-head $h$ moves away from the head of the sleeve $f$ and the turning movement of said screw winds the spring $g$ which has its ends anchored to the screw $e$ and nut $f$ respectively.

When now the handle C is turned counter-clockwise to release the jaws, the pressure at said jaws is at once reduced permitting the spring $g$ to unwind and in its unwinding movement to rotate the screw $e$ until the screw-head $h$ returns to normal position against the face of the sleeve $f$. The tube or sleeve $d$ is now again held by said spring against rotation so that further turning of the screw c causes said tube or sleeve d to move rapidly along said screw carrying the movable member b with its jaw b¹ away from the fixed jaw a².

I claim:

1. A clamping device comprising a movable jaw, a compound screw for moving said jaw, said screw having a quick-acting portion and a slow-acting portion, and automatic means for rendering said quick-acting portion operative when said jaw is free to move and for rendering said slow-acting portion operative when said jaw meets with resistance, said slow-acting portion being non-rotatable while the quick-acting portion is operative.

2. A clamping device comprising a movable jaw, a quick-acting screw and a slow-acting screw connected in series to said jaw for moving the jaw, and means for preventing rotation of said slow-acting screw until said jaw meets with resistance and for then permitting said slow-acting screw to rotate.

3. A clamping device comprising a movable jaw, a quick-acting screw and a slow-acting screw connected in series to said jaw for moving the jaw, and a spring for restraining the rotation of said slow-acting screw, said spring being adapted to prevent rotation of the slow-acting screw while said jaw is free to move and to permit rotation of the slow-acting screw when said jaw meets with resistance.

4. A clamping device comprising a movable jaw, a quick-acting screw and a slow-acting screw connected in series to said jaw for moving the jaw, and a torsion spring arranged to restrain the rotation of said slow-acting screw, the strength of said spring being such as to permit rotation of the slow-acting screw only when pressure is applied to said jaw and to return the slow-acting screw to normal position when the pressure is relieved, said slow-acting screw being non-rotatable except as aforesaid.

5. A clamping device comprising a movable jaw having a threaded portion, rotary means for actuating said jaw having a threaded portion, connecting means having threaded portions meshing with said first and second threaded portions respectively, one coöperating pair of said threaded portions having a high pitch and the other pair having a low pitch, and yielding means for restraining relative movement of the portions of said low pitch pair so that rotation of said actuating means produces relative movement of the portions of said high pitch pair until said jaw meets with resistance and then produces movement of said low pitch pair, said threaded portion of the movable jaw being non-rotatable at all times.

6. A clamping device comprising a movable jaw having a threaded portion, rotary means for actuating said jaw having a threaded portion, connecting means having threaded portions meshing with said first and second threaded portions respectively, one coöperating pair of said threaded portions having a high pitch and the other pair having a low pitch, and a torsion spring anchored at opposite ends to the respective portions of said low pitch pair for restraining the relative movement of the portions of the low pitch pair upon rotation of said actuating means, the strength of said spring being such as to prevent relative rotation of the portions of the low pitch pair until said jaw meets with resistance and then to permit such rotation, both threaded portions of the low pitch pair being non-rotatable while the two threaded portions of the high pitch pair are rotating relatively to each other.

7. A vise comprising a fixed jaw and a movable jaw, a screw rotatably mounted in one of said jaws, a screw non-rotatably mounted in the other of said jaws, connecting means having screws meshing with said first and second screws respectively, one coöperating pair of said screws having a high pitch and the other coöperating pair having a low pitch, and a torsion spring anchored at its opposite ends to the two screws respectively of said low pitch pair, said spring being adapted upon rotation of said first screw to prevent relative rotation of the low pitch screws until the vise begins to clamp, then to permit such rotation, and when said first screw is rotated to unclamp the vise to return the low pitch screws to their initial positions relative to each other.

8. A vise comprising a jaw member and a stock-engaging member having abutting faces, said members having registering openings in their abutting faces, a tubular bushing fitted tightly into said openings, and a screw passing through one of said members, thence through said bushing, and threading into said other member.

Signed by me at Geneva, Switzerland, this 10th day of February, 1919.

MAURICE CUENDET.

Witnesses:
Louis D. Munier,
Lewis W. Haskell.